United States Patent
Hackl et al.

(10) Patent No.: US 6,446,749 B2
(45) Date of Patent: Sep. 10, 2002

(54) METHOD AND ARRANGEMENT FOR OPERATING A STEERING SYSTEM FOR A MOTOR VEHICLE

(75) Inventors: Matthias Hackl, Vaihingen; Wolfgang Krämer, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/846,189

(22) Filed: May 2, 2001

Related U.S. Application Data

(63) Continuation of application No. 09/194,734, filed on Dec. 2, 1998, now abandoned.

(30) Foreign Application Priority Data

Apr. 2, 1997 (DE) .......................................... 197 13 576

(51) Int. Cl.$^7$ ................................................. B62D 5/04
(52) U.S. Cl. ........................ 180/446; 180/443; 180/204; 701/41; 701/42
(58) Field of Search ................................. 180/443, 444, 180/446, 204; 701/41, 42

(56) References Cited

U.S. PATENT DOCUMENTS

| | | | | |
|---|---|---|---|---|
| 4,629,952 A | | 12/1986 | Shimizu ..................... 318/432 |
| 4,664,211 A | | 5/1987 | Oshita et al. ................ 180/142 |
| 4,727,950 A | * | 3/1988 | Shimizu et al. ............. 180/446 |
| 4,735,271 A | | 4/1988 | Shimizu .................... 180/79.1 |
| 4,754,829 A | | 7/1988 | Shimizu et al. ............ 180/79.1 |
| 4,785,901 A | * | 11/1988 | Maeda ....................... 180/142 |
| 4,837,692 A | | 6/1989 | Shimizu ................ 364/424.05 |
| 4,956,590 A | | 9/1990 | Phillips ...................... 318/432 |
| 5,020,616 A | * | 6/1991 | Yagi et al. .................. 180/446 |
| 5,086,859 A | * | 2/1992 | Takahashi et al. .......... 180/446 |
| 5,205,371 A | * | 4/1993 | Karnopp ..................... 180/446 |
| 5,668,721 A | | 9/1997 | Chandy ........................ 701/41 |
| 5,853,064 A | * | 12/1998 | Hackl et al. ................ 180/422 |
| 5,913,913 A | * | 6/1999 | Okanoue et al. .............. 701/41 |
| 6,026,926 A | * | 2/2000 | Noro et al. ................. 180/446 |
| 6,144,909 A | * | 11/2000 | Sakamaki et al. ............. 701/41 |
| 6,244,372 B1 | * | 6/2001 | Sakamaki et al. .......... 180/422 |

FOREIGN PATENT DOCUMENTS

| | | |
|---|---|---|
| DE | 3908217 | 9/1989 |
| GB | 2170763 | 8/1986 |

* cited by examiner

*Primary Examiner*—Brian L. Johnson
*Assistant Examiner*—Daniel Yeagley
(74) *Attorney, Agent, or Firm*—Walter Ottesen

(57) ABSTRACT

A steering system for a motor vehicle having at least one steerable wheel, an actuator and a superposing gear assembly. The steering movement, which is initiated by the driver of the vehicle, and the movement, which is initiated by the actuator, are superposed by the superposing gear assembly for generating a steering movement of the steerable wheel within pregiven steering stops. The essence of the invention is that the movement, which is initiated by the actuator, is at least reduced before reaching the steering stop. According to the invention, one arrives at a superposed steering with which the steering stops are considered so as to provide increased safety and increased comfort.

6 Claims, 4 Drawing Sheets

METHOD AND ARRANGEMENT FOR OPERATING A STEERING SYSTEM FOR A MOTOR VEHICLE

This is a continuation of application Ser. No. 09/194,734, filed Dec. 2, 1998 now abandoned.

FIELD OF THE INVENTION

The invention relates to a method and an arrangement for operating a steering system for a motor vehicle.

BACKGROUND OF THE INVENTION

Such a steering system is shown in DE-OS 40 31 316 (corresponds to U.S. Pat. No. 5,205,371) and will be explained with respect to FIGS. 1 and 2 insofar as relevant for an understanding of the present invention. In a steering system of this kind, the steering movements, which are developed by the driver via the steering wheel 11 or 21 (that is, the steering wheel angle $\delta_L$, which is detected by the sensor 28), are superposed in the superposing gear assembly 12 or 22 with the movements of the actuator 13 or 23 (that is, the motor angle $\delta_M$) The superposed movement $\delta_L'$, which so arises, is transmitted via the steering transmission 14 (or the steering rod 16) to the wheels 15a and 15b, which are configured so as to be steerable, to adjust the steering angle $\delta_V$. Here, the actuator (13 or 23) is configured as an electric motor. The principal of operation of such a servo steering system comprises that the steering can be made very indirect via the transmission ratio $i_u$ of the superposing gear assembly 12 or 22 and thereby attain small steering wheel torques $M_L$. Very large steering wheel angles $\delta_L$, which are caused in this way, are avoided in that suitable motor angles $\delta_M$ are superposed so that, in correspondence to the relationship $$\delta_L' = \delta_L/i_u + \delta_M,$$

output angles $\delta'$ can be adjusted required with conventional size steering wheel angles. The motor angle $\delta_M$, which is required to support steering, or its desired value, is determined from the steering wheel angle $\delta_L$. Furthermore, the motor angle $\delta_M$ can also be selected in dependence upon signals Sm. These signals Sm represent the vehicle movements detected by the sensors 26.

Furthermore, it is generally known that the steering wheel angles $\delta_V$ are limited by so-called steering stops depending upon construction.

SUMMARY OF INVENTION

The object of the present invention is to consider the steering stops for such a superposing steering with respect to increased safety and comfort.

As mentioned, the invention relates to a steering system for a motor vehicle having at least one steerable wheel, an actuator and a superposing gear assembly. By means of the superposing gear assembly, the steering movement initiated by the driver of the vehicle and the movement, which is initiated by the actuator, for generating the steering movement of the steerable wheel is superposed within pregiven steering stops.

The essence of the invention is to reduce the movement, which is initiated by the actuator, before reaching a steering stop.

According to the invention, no further additional angle can be superposed when reaching the stops delimiting the steering wheel angles. Otherwise, the steering wheel is rotated against the steering wheel rotational direction which was present previously whereby the driver is greatly irritated. With the superposition of the additional angle up to close to the stops, the above-mentioned problem of the steering wheel return rotation, however, occurs which is effectively prevented by the run-out of the invention of the steering wheel support in the region of the steering stops. This superposition of the additional angle takes place especially with rapid steering movements such as when turning in three strokes because of the after-running of the actuator caused by inertia (for example, the after-running of the motor armature when using an electric motor). With the invention and with a power steering pursuant to the movement superposition principal, one obtains added safety because the driver is not irritated by an unexpected rotation of the steering wheel. Furthermore, the application of the invention means added comfort because of the continuous run-out of the steering support.

In an advantageous configuration of the invention, the movement, which is initiated by the actuator, is reduced to the value zero before reaching a steering stop (that is, up to the standstill of the position drive). In the region of the steering stops therefore no servo support takes place.

Furthermore, it can be provided that the movement, which is initiated by the actuator, is reduced before reaching a steering stop by means of a pregivable or pregiven characteristic, especially to the value zero.

It is especially advantageous to reduce the movement, which is initiated by the actuator, within a predetermined region before reaching a steering stop and especially to reduce this movement to the value zero. This reduction can also take place with a pregiven or pregivable characteristic.

Furthermore, it is very advantageous that, after the reduction of the movement (which is initiated by the actuator), the actuator is switched off before reaching a steering stop and/or is braked. For this purpose, it can be especially provided that the switchoff and/or braking is done in dependence upon a comparison of the detected steering movement of the steerable wheel and/or of the detected steering movement, which is initiated by the driver of the vehicle, to a pregivable or pregiven threshold value. In this configuration, a two-stage procedure is suggested in the region of the steering stops. First, in a range forward of reaching a steering stop, a reduction of the actuator movements takes place and, thereafter, a switchoff and/or braking is actuated. This has the background that, for the control of the actuator, control deviations and/or a certain after-run can occur so that a simple driving of the actuator in the sense of a reduction is not sufficient in order to bring it to standstill when reaching a steering stop.

Reaching the steering stops and/or the start and/or the end of the reduction of the movement, which is initiated by the actuator, can take place with a detection of the steering movement of the steerable wheel and/or via a detection of the steering movement which is initiated by the driver of the vehicle.

Furthermore, it is especially provided that the abovementioned range is determined by at least one threshold value for the steering movement of the steerable wheel and/or for the steering movement initiated by the driver of the vehicle.

DESCRIPTION OF THE PREFERRED EMBODIMENTS OF THE INVENTION

In the following, the invention is described with respect to an embodiment. As an example, the description proceeds from a superposing steering which was initially mentioned.

Figure 1:
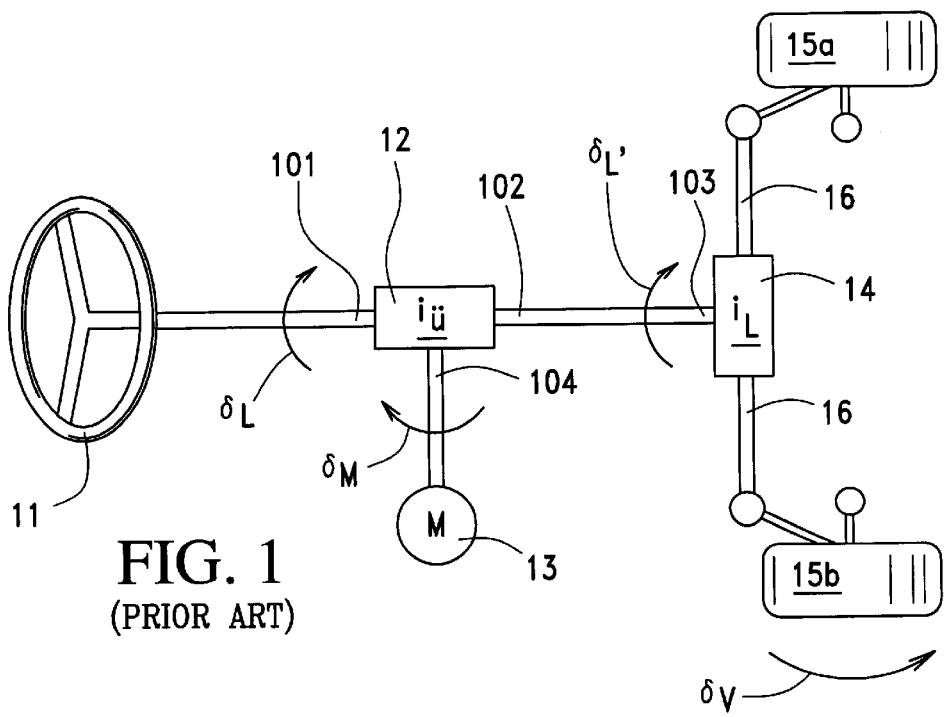
FIGS. 1 and 2 schematically show the steering system of the state of the art from which the invention proceeds.
Figure 2:
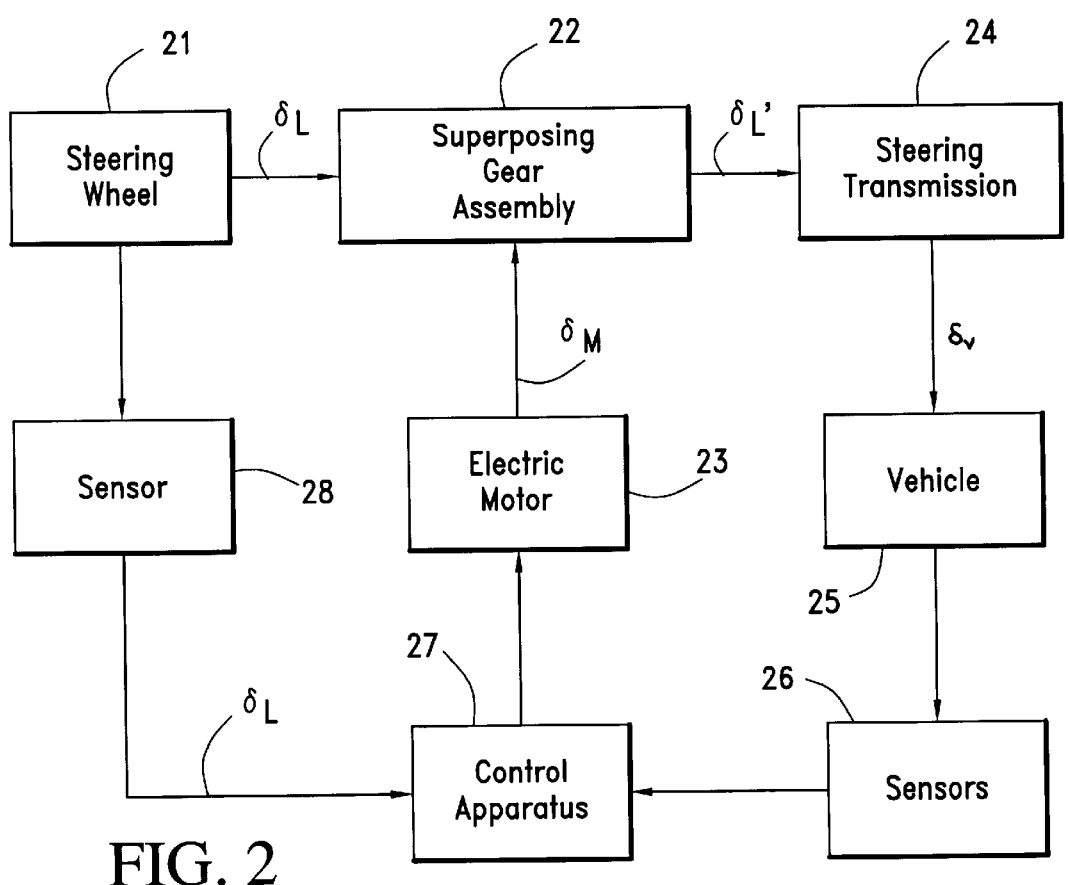

FIGS. 1 and 2 show a steering wheel, which can be actuated by the driver of a vehicle, with reference numerals 11 and 21, respectively. With the actuation of the steering wheel 11, the steering wheel angle $\delta_L$ is supplied to the superposing gear assembly 12 and, with the actuation of the steering wheel 21, the steering wheel torque $M_L$ is supplied to the superposing gear assembly 22. At the same time, the motor angle $\delta_M$ of the actuator 13 is supplied to the superposing gear assembly 12 and the motor angle $\delta_M$ of the actuator 23 is supplied to the superposing gear assembly 22. The actuator can be configured as an electric motor. At the output end of the superposing gear assembly 12, the superposed movement $\delta_L{}'$ is supplied to the steering transmission 14. At the output end of the superposing gear assembly 22, the superposed movement $\delta_L{}'$ is supplied to the steering transmission 24. The steering transmission (14 or 24), in turn, charges the steerable wheels 15a and 15b with the steering angle $\delta_V$ via the steering rod 16 in correspondence to the total angle $\delta_L{}'$. In FIG. 2, sensors 28 and 26 can be seen and sensor 28 detects the steering wheel angle $\delta_L$ and supplies the same to the control apparatus 27; whereas, the sensors identified by reference numeral 25 sense the movements of the vehicle 25 (for example, yaw movements, transverse acceleration, road speed, et cetera) and supply the same to the control apparatus 27. The control apparatus 27 determines a positioning quantity u for driving the actuator (13 or 23). The control apparatus 27 determines the positioning quantity u in dependence upon the detected steering wheel angle $\delta_L$ and, if required, in dependence upon the vehicle movements.

As already mentioned, when reaching the stops delimiting the wheel angles $\delta_V$, no further additional angle $\delta_M$ may be superposed. Otherwise, the steering wheel (11 or 21) is rotated in opposition to the steering wheel rotation direction present up to that time whereby the driver is greatly irritated. For the superposition of the additional angle $\delta_M$ up to close to the stops, the above-mentioned problem of the steering wheel return rotation occurs which can be prevented with the run-out of the steering wheel support in the region of the stop as explained below. The above-mentioned problem occurs for rapid rotational movements (such as when turning in three strokes) because of the after-running of the actuator (13 or 23) caused by inertia (for example, because of the inertia of the motor armature in the design of the actuator as an electric motor).

Run-out of the steering support then comprises two parts, the run-out zone and the switchoff threshold. Both are described below.

Run-out Zone

In a power steering system in accordance with the movement superposition principal, a steering ratio $$i_{Lenk} = i_U * i_L$$

is determined wherein $i_U$ is the transmission ratio of the superposing gear assembly (12 or 22) and $i_L$ is the transmission ratio of the steering transmission (14 or 24). The steering transmission ratio $i_{Lenk}$ is effective when no additional angles $\delta_M$ are introduced. With the angle superposition, the angle relationship between $\delta_L$ and $\delta_L{}'$ or $\delta_V$ is so changed that the transmission ratio $i_{eff}$ results for the driver.

According to the invention, the actuator motor (13 or 23) for generating the additional angle $\delta_M$ should be stationary in the region of the steering stops, that is, the transmission ratio $i_{Lenk}$ should be effective between the steering wheel and wheels in the angular region just forward of the steering stops. In the remaining steering angle range, the angle relationship $i_{eff}$ should apply, however, which is in general clearly less than $i_{Lenk}$.

Figure 3:
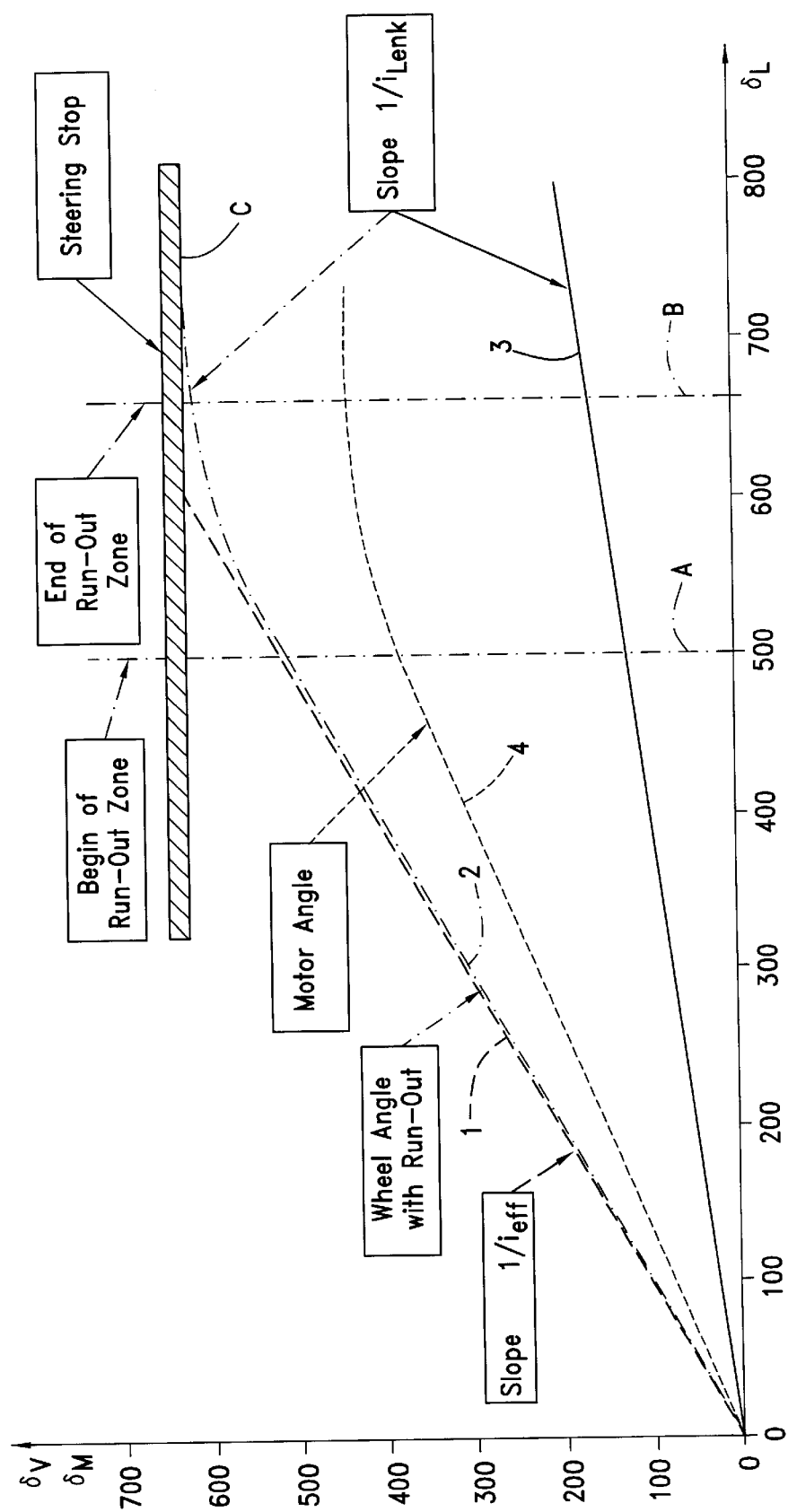
FIGS. 3, 4 and 5 show different traces of the steering angle or the speeds thereof.

The traces shown in FIG. 3 are exemplary and are of the motor angle $\delta_M$ (trace 4), the wheel steering angle $\delta_V$ (trace 2) as well as the trace of the slope $1/i_{eff}$ (trace 1) and the slope $1/i_{Lenk}$ (trace 3). The steering wheel angle $\delta_L$, which is initiated by the driver, is plotted on the horizontal axis and the wheel steering angle $\delta_V$ is plotted on the vertical axis and, for the trace 4, the motor angle $\delta_M$ is plotted on the vertical axis. Furthermore, the run-out region is marked with the limits A and B and the steering stop is marked with the limit C.

To achieve a comfortable steering performance, a continuous transition from $i_{eff}$ to $i_{Lenk}$ and back must be achieved which takes place within a run-out zone (region between limits A and B) which lies shortly forward of the steering stops (limit C).

The run-out according to the invention is characterized, for example, by a parabola segment having a start which exhibits a slope corresponding to $1/i_{eff}$ and whose end exhibits a slope corresponding to $1/i_{Lenk}$.

As an alternative to the parabola-shaped run-out, the transition between the two slopes in the run-out zone can also be effected with a circular-arc segment or a sine-shaped segment.

The run-out of the additional steering angle $\delta_M$ according to the invention is achieved via a corresponding drive of the actuator 23 by the control apparatus 27. This drive can, for example, take place in such a manner that a desired value $\delta_{M,des}$ is supplied to a lower order position controller. The position controller then drives the motor 23 in such a manner that a corresponding actual angle value $\delta_{M,act}$ is adjusted as precisely as possible. The desired value $\delta_{M,des}$ represents the desired trace of the motor angle $\delta_M$.

Figure 4:
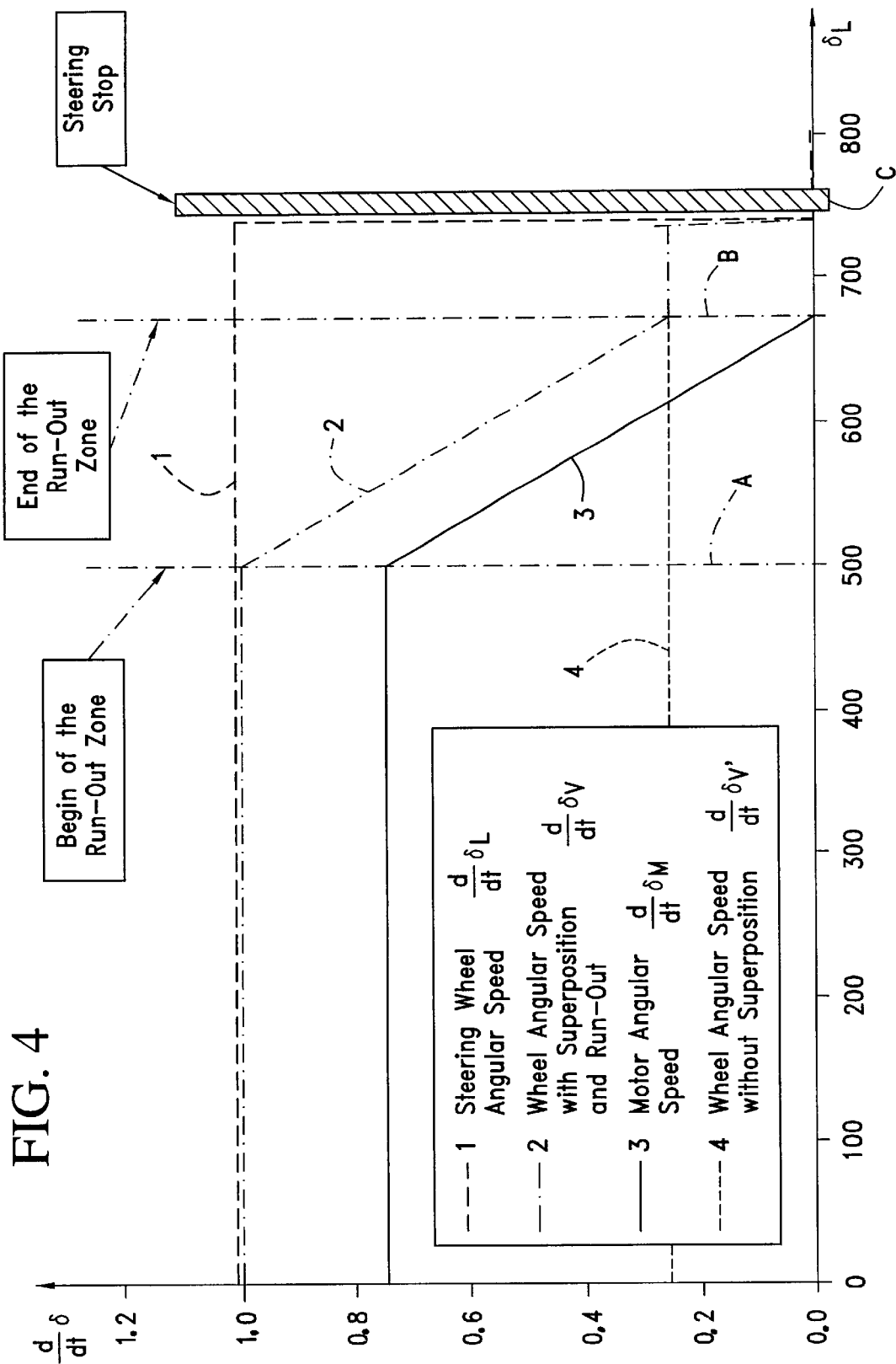

FIG. 4 shows the steering wheel angle $\delta_L$ (horizontal axis) plotted against the steering angle speed $d\delta_L/dt$ with superposition of the motor steering angle $\delta_M$ (trace 1), the wheel steering angle speed $d\delta_V/dt$ (trace 2), the motor angle speed $d\delta_M/dt$ (trace 3) and the wheel steering angle speed $d\delta_V/dt$ without superposition of the motor steering angle $\delta_M$ (trace 4). The run-out zone is again characterized by the limits A and B and the steering stop is characterized with the limit C.

With respect to FIG. 4, one recognizes that the parabola-shaped run-out is favorable with respect to the trace 3 of the motor angle speed $d\delta_M/dt$ because this speed is continuously reduced in the run-out zone (A, B).

Switchoff Threshold

Figure 5:
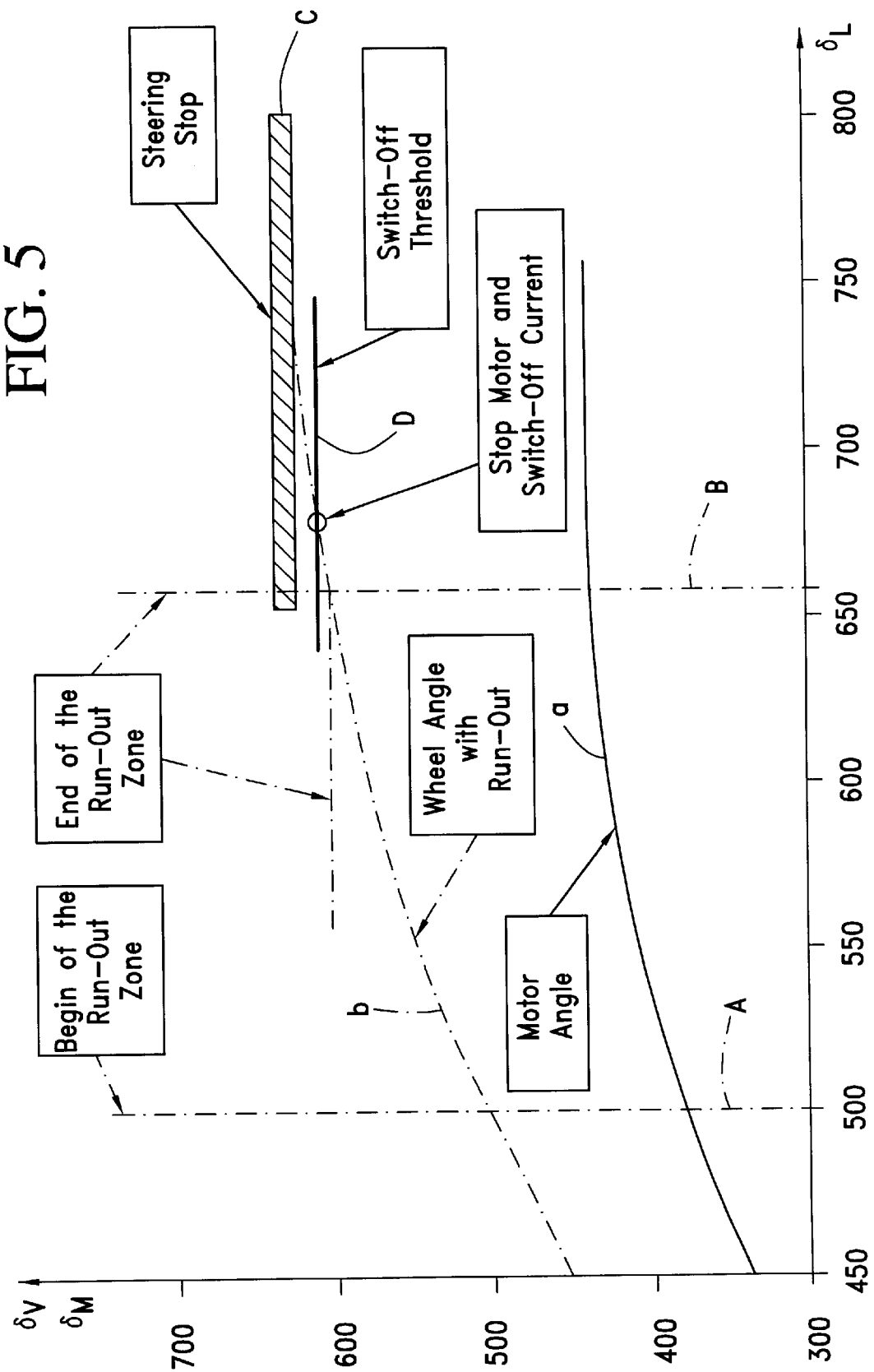

FIG. 5 shows a similar plot as FIG. 3.

The actuator 13 or 23 for the additional angle $\delta_M$ is conventionally a position controlled motor, such as an electric motor. Here, control deviations $(\delta_{M,act} - \delta_{M,des})$ occur from the pregiven angle desired value $\delta_{M,des}$, for example, for rapid steering maneuvers or even via an after-running of the motor armature and the connected transmission parts because of the mass moment of inertia. It therefore occurs that the motor still rotates above the run-out zone (over the limit B to the steering stop) even though it must be at standstill already in this region.

As can be seen in FIG. 5, for this reason, a switchoff threshold D is fixed shortly after the end B of the run-out zone forward of the steering stop C. When this switchoff threshold D is exceeded, the actuator is braked to standstill by a corresponding supply of current and is then switched off.

The gear assembly 12 or 22, which is generally configured as a self-restraining gear assembly, prevents a change of the additional angle $\delta_{M,act}$ via possibly applied torques whereby a return rotation of the steering wheel 11 or 21 is reliably avoided.

What is claimed is:

1. A method for operating a steering system of a motor vehicle having at least one steerable wheel, the steering system including a superposing gear assembly and an actuator for supplying an angular movement ($\delta_M$) supplied by said actuator to said superposing gear assembly, the method comprising the steps of:

providing pregiven steering stops (C) within which said steerable wheel is turned;

superposing a steering movement ($\delta_L$), which is initiated by the driver of said vehicle, and said angular movement ($\delta_M$), which is initiated by said actuator, in said superposing gear assembly to generate a steering movement ($\delta_V$) of said steerable wheel within said pregiven steering stops (C);

reducing said angular movement ($\delta_M$) in accordance with a pregivable or pregiven characteristic in a run-out zone (A, B) before reaching one of said pregiven steering stops (C);

providing a switchoff threshold (D) shortly after the end (B) of said run-out zone (A, B) forward of said pregiven steering stops (C); and, when said switchoff threshold (D) is exceeded, braking said actuator to standstill by a corresponding supply of current and then switching said actuator off.

2. The method of claim 1, comprising the further step of reducing said angular movement ($\delta_M$) to the value zero before reaching one of said steering stops (C).

3. The method of claim 1, comprising the further steps of switching off and/or braking said actuator before reaching one of said steering stops (C) after the reduction of said angular movement ($\delta_M$).

4. A method for operating a steering system of a motor vehicle having at least one steerable wheel, the steering system including a superposing gear assembly and an actuator for supplying an angular movement ($\delta_M$) supplied by said actuator to said superposing gear assembly, the method comprising the steps of:

providing pregiven steering stops (C) within which said steerable wheel is turned;

superposing a steering movement ($\delta_L$), which is initiated by the driver of said vehicle, and said angular movement ($\delta_M$), which is initiated by said actuator, in said superposing gear assembly to generate a steering movement ($\delta_V$) of said steerable wheel within said pregiven steering stops (C);

reducing said angular movement ($\delta_M$) in accordance with a pregivable or pregiven characteristic in a run-out zone (A, B) before reaching one of said pregiven steering stops (C);

providing a switchoff threshold (D) shortly after the end (B) of said run-out zone (A, B) forward of said pregiven steering stops (C); and, switching off and/or braking said actuator in dependence upon a comparison of said steering movement ($\delta_V$) of the steerable wheel and/or of the steering movement ($\delta_L$) initiated by the driver with said switchoff threshold (D).

5. A method for operating a steering system of a motor vehicle having at least one steerable wheel, the steering system including a superposing gear assembly and an actuator for supplying an angular movement ($\delta_M$) supplied by said actuator to said superposing gear assembly, the method comprising the steps of:

providing pregiven steering stops (C) within which said steerable wheel is turned;

superposing a steering movement ($\delta_L$), which is initiated by the driver of said vehicle, and said angular movement ($\delta_M$), which is initiated by said actuator, in said superposing gear assembly to generate a steering movement ($\delta_V$) of said steerable wheel within said pregiven steering stops (C);

reducing said angular movement ($\delta_M$) in accordance with a pregivable or pregiven characteristic in a run-out zone (A, B) before reaching one of said pregiven steering stops (C);

providing a switchoff threshold (D) shortly after the end (B) of said run-out zone (A, B) forward of said pregiven steering stops (C);

causing the end of the reduction of the angular movement ($\delta_M$) to be reached by detecting the steering movement ($\delta_V$) of the steerable wheel and/or by detecting said steering movement ($\delta_L$) initiated by the driver; and, when said switchoff threshold (D) is exceeded, braking said actuator to standstill by a corresponding supply of current and then switching said actuator off.

6. A method for operating a steering system of a motor vehicle having at least one steerable wheel, the steering system including a superposing gear assembly and an actuator for supplying an angular movement ($\delta_M$) supplied by said actuator to said superposing gear assembly, the method comprising the steps of:

providing pregiven steering stops (C) within which said steerable wheel is turned;

superposing a steering movement ($\delta_L$) initiated by the driver, which is initiated by the driver of said vehicle, and said angular movement ($\delta_M$), which is initiated by said actuator, in said superposing gear assembly to generate a steering movement ($\delta_V$) of said steerable wheel within said pregiven steering stops (C);

reducing said angular movement ($\delta_M$) in accordance with a pregivable or pregiven characteristic in a run-out zone (A, B) before reaching one of said pregiven steering stops (C);

determining said predetermined range (A, B) by at least a threshold value for said steering movement ($\delta_V$) of the steerable wheel and/or for said steering movement ($\delta_L$);

providing a switchoff threshold (D) shortly after the end (B) of said run-out zone forward of said pregiven steering stops (C); and, when said switchoff threshold (D) is exceeded, braking said actuator to standstill by a corresponding supply of current and then switching said actuator off.

* * * * *